United States Patent
Jorgenson et al.

(10) Patent No.: US 7,180,210 B1
(45) Date of Patent: Feb. 20, 2007

(54) STANDBY GENERATOR INTEGRATION SYSTEM

(76) Inventors: Joel Jorgenson, 3130 36th Ave. SW., Fargo, ND (US) 58104; Joydeep Mitra, 504 Northpark Dr., Las Cruces, NM (US) 88005-3867; Donald Stuehm, 33821 N. Cotton Lake Rd., Rochert, MN (US) 56578-9708; Terry Shaner, 509 Battle Ave., Winchester, VA (US) 22601

( * ) Notice: Subject to any disclaimer, the term of this patent is extended or adjusted under 35 U.S.C. 154(b) by 409 days.

(21) Appl. No.: 10/685,304

(22) Filed: Oct. 10, 2003

Related U.S. Application Data

(60) Provisional application No. 60/418,036, filed on Oct. 11, 2002.

(51) Int. Cl.
*H02J 3/46* (2006.01)
*H02J 9/00* (2006.01)

(52) U.S. Cl. ........................................ 307/153; 307/65

(58) Field of Classification Search .................. 307/65, 307/153, 73, 76, 78
See application file for complete search history.

(56) References Cited

U.S. PATENT DOCUMENTS

| | | | | |
|---|---|---|---|---|
| 3,784,896 A | | 1/1974 | Lakota | 322/20 |
| 5,642,006 A | | 6/1997 | Cech | 307/87 |
| 5,767,591 A | * | 6/1998 | Pinkerton | 307/64 |
| 6,112,136 A | * | 8/2000 | Paul et al. | 700/293 |
| 6,169,390 B1 | * | 1/2001 | Jungreis | 322/4 |
| 6,172,432 B1 | * | 1/2001 | Schnackenberg et al. | 307/23 |
| 6,184,593 B1 | * | 2/2001 | Jungreis | 307/64 |
| 6,239,997 B1 | * | 5/2001 | Deng | 363/95 |
| 6,657,319 B2 | * | 12/2003 | Sanada | 307/45 |

FOREIGN PATENT DOCUMENTS

WO WO 02/066974 8/2002

OTHER PUBLICATIONS

A Fast Following Synchronizer of Generators, Dec. 1988, IEEE Transaction of Energy Conversion, vol. 3, No. 4, 5 Pages.
Synchronizing and Paralleling Equipment and Systems for Synchronous Machines and Networks, ABB Automation, 8 Pages.
High Integrity Power Control Systems for Critical Facilities, Russelectric, 4 Pages.

* cited by examiner

*Primary Examiner*—Lynn Feild
*Assistant Examiner*—Michael Rutland-Wallis
(74) *Attorney, Agent, or Firm*—Michael S. Neustel

(57) ABSTRACT

A standby generator integration system for efficiently integrating one or more standby generators into an operational power grid. The standby generator integration system includes a control center in communication with a plurality of control units. Each of the control units are in communication with a standby generator, the power grid and a contactor unit. The control unit calculates the hard minimum of the grid voltage and the generator voltage where switching is desired by summing the rectified voltages together. The control unit then initiates the closing of the contactor unit to bring the standby generator online with the power grid.

11 Claims, 8 Drawing Sheets

Generator Integration Routine

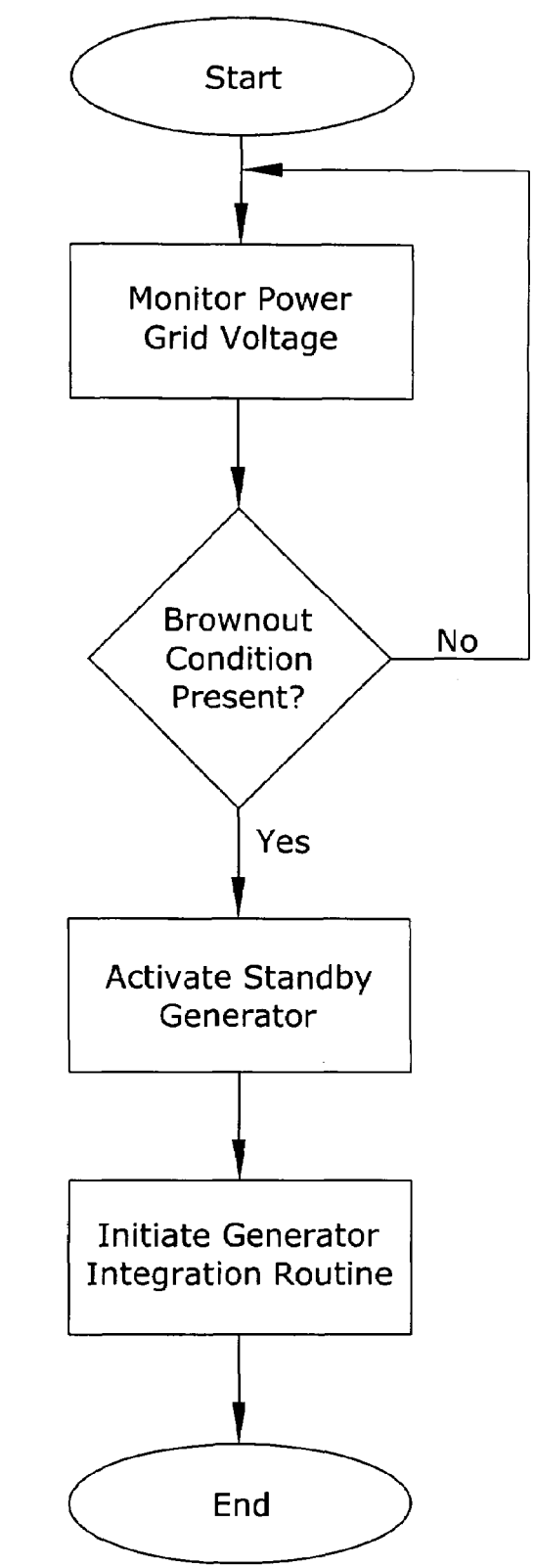
Brownout Condition Routine       FIG. 8

STANDBY GENERATOR INTEGRATION SYSTEM

CROSS REFERENCE TO RELATED APPLICATIONS

I hereby claim benefit under Title 35, United States Code, Section 119(e) of U.S. provisional patent application Ser. No. 60/418,036 filed Oct. 11, 2002. The 60/418,036 application is currently pending. The 60/418,036 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to distributed generation systems and more specifically it relates to a standby generator integration system for efficiently integrating one or more standby generators into an operational power grid.

2. Description of the Related Art

Electrical power generation and capacity are in short supply through the United States. There are thousands of standby generators utilized by various businesses and individuals ranging in size from 3 kW to greater than 50 kW. Integration of these standby generators into the power grid is desired to help increase electrical system capacity and potentially create revenue for the generator owner.

In these respects, the standby generator integration system according to the present invention substantially departs from the conventional concepts and designs of the prior art, and in so doing provides a system primarily developed for the purpose of efficiently integrating one or more standby generators into an operational power grid.

BRIEF SUMMARY OF THE INVENTION

In view of the foregoing disadvantages inherent in the known types of distributed generation systems now present in the prior art, the present invention provides a new standby generator integration system wherein the same can be utilized for efficiently integrating one or more standby generators into an operational power grid.

The general purpose of the present invention, which will be described subsequently in greater detail, is to provide a new standby generator integration system that has many of the advantages of the distributed generation systems mentioned heretofore and many novel features that result in a new standby generator integration system which is not anticipated, rendered obvious, suggested, or even implied by any of the prior art distributed generation systems, either alone or in any combination thereof.

To attain this, the present invention generally comprises a control center in communication with a plurality of control units. Each of the control units are in communication with a standby generator, the power grid and a contactor unit. The control unit calculates the hard minimum of the grid voltage and the generator voltage where switching is desired by summing the rectified voltages together. The control unit then initiates the closing of the contactor unit to bring the standby generator online with the power grid.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a standby generator integration system that will overcome the shortcomings of the prior art systems.

A second object is to provide a standby generator integration system for efficiently integrating one or more standby generators into an operational power grid.

Another object is to provide a standby generator integration system that may be utilized with respect to various sizes and types of standby generators.

An additional object is to provide a standby generator integration system that reduces out of phase connection of a standby generator with a power grid.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 8 is a flowchart illustrating the brownout condition routine.

DETAILED DESCRIPTION OF THE INVENTION

A. Introduction

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a communications network, such as but not limited to the Internet.

B. Communications Network

Figure 1:
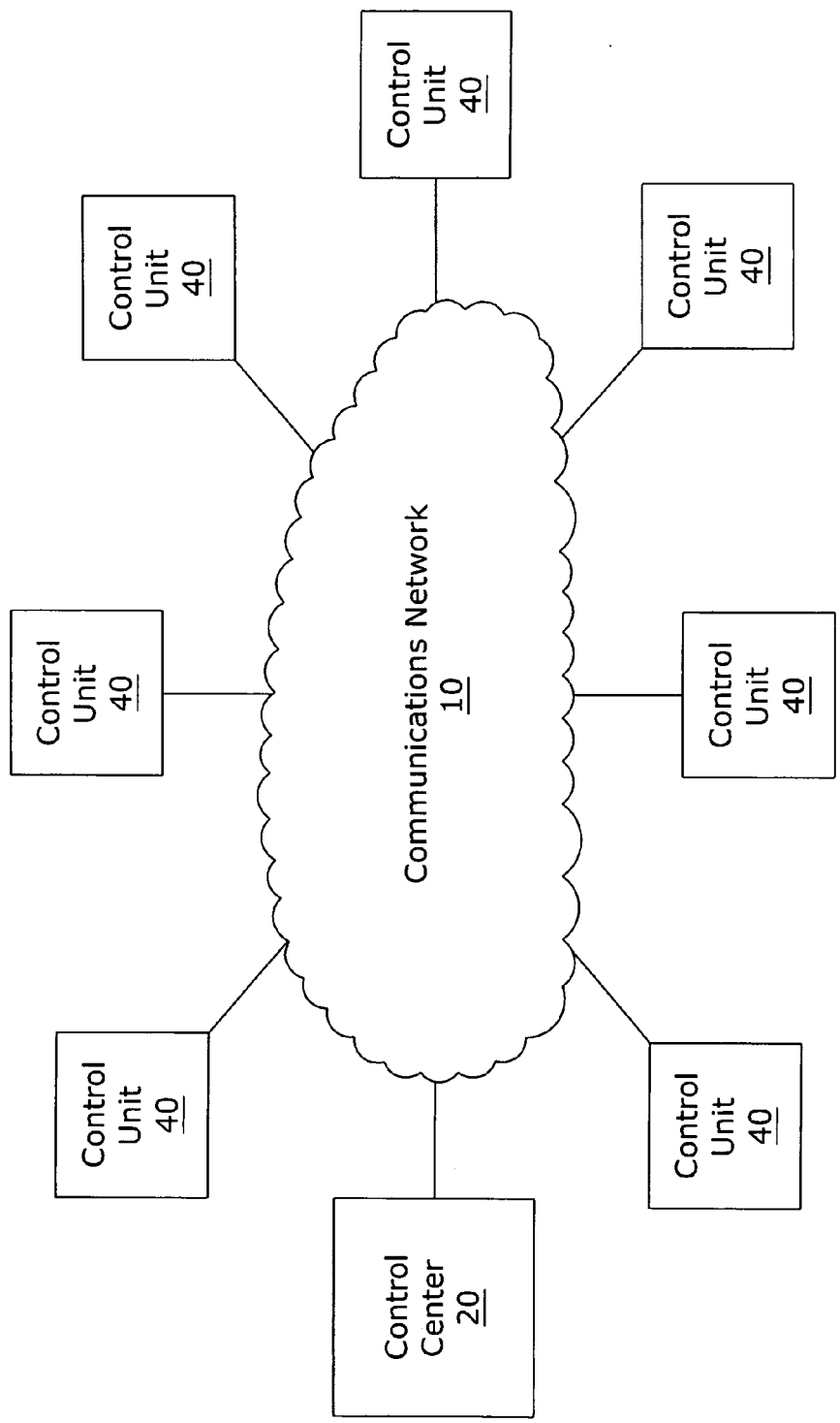
FIG. 1 is a block diagram illustrating an exemplary communication network for the control center to communicate with the control units.

As shown in FIG. 1, a communications network 10 is used for the control center 20 to communicate with the control units 40. The present invention may be utilized upon various communications networks 10 such as but not limited to global computer networks, local area networks (LAN), wide area networks (WAN), campus area networks (CAN), metropolitan-area networks (MAN), power lines, cable, and wireless. Various protocols may be utilized by the electronic devices for communications such as but not limited to HTTP, SMTP, FTP and WAP (Wireless Application Protocol). The present invention may be implemented upon various wireless networks such as but not limited to CDPD, CDMA, GSM, PDC, PHS, TDMA, FLEX, REFLEX, IDEN, TETRA, DECT, DATATAC, and MOBITEX. The present invention may also be utilized with online services and internet service providers such as AMERICA ONLINE (AOL), COMPUSERVE, WEBTV, and MSN INTERNET SERVICES. The present invention may utilize the Internet for transmitting data, however it can be appreciated that as future technologies are created that various aspects of the invention may be practiced with these improved technologies.

C. Standby Generators

The present invention may be utilized in conjunction with standby generators 30 of various sizes (e.g. 3 kW to greater than 50 kW). The standby generators 30 may utilize fossil fuels (e.g. gas, diesel) or other types of fuels suitable for a standby generator 30. It can be appreciated that the type or size of standby generator 30 that the present invention is utilized in conjunction with is not significant to operation of the present invention. The illustration and discussion of standby generators 30 should not limit the scope of protection for the present invention.

D. Contactor Unit

The contactor unit 50 may be comprised of any contactor structure capable of switching a standby generator 30 onto an electrical power grid 12. Contactor units are well known in the art of electrical power distribution networks and further explanation of these devices is not required for the present invention. The present invention is capable of communication with various types of contactor units 50 and the invention should not be limited in scope to one type of contactor unit 50. It can be appreciated that the contactor unit 50 utilized in conjunction with the present invention is relatively consistent and has a nominal predetermined time delay. Variations in the time delay caused by internal and/or external factors are compensated via the time-averaged calculation of the phase difference between generator voltage and grid voltage.

E. Control Unit

Figure 2:
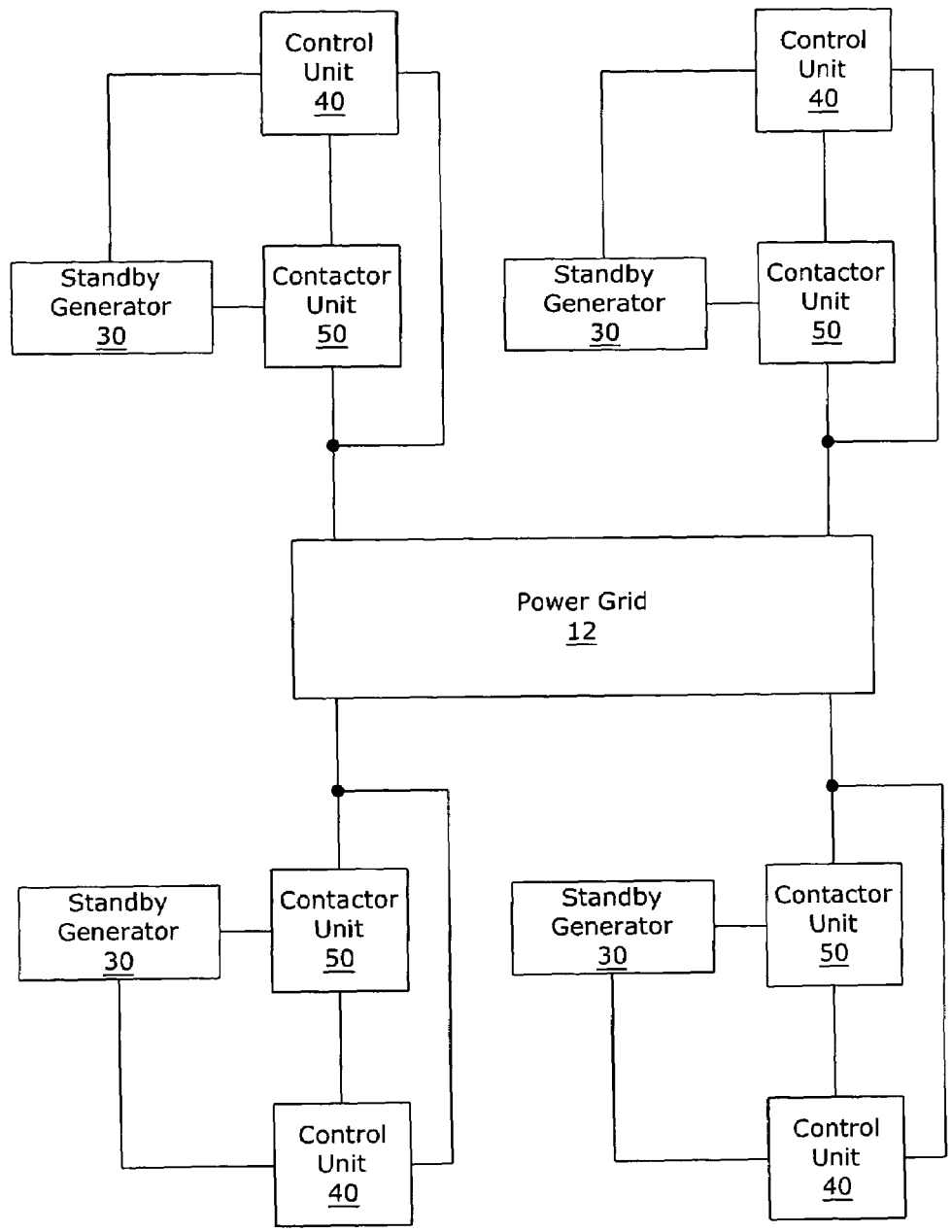
FIG. 2 is a block diagram illustrating the present invention with respect to a standby generator and a power grid.
Figure 3:
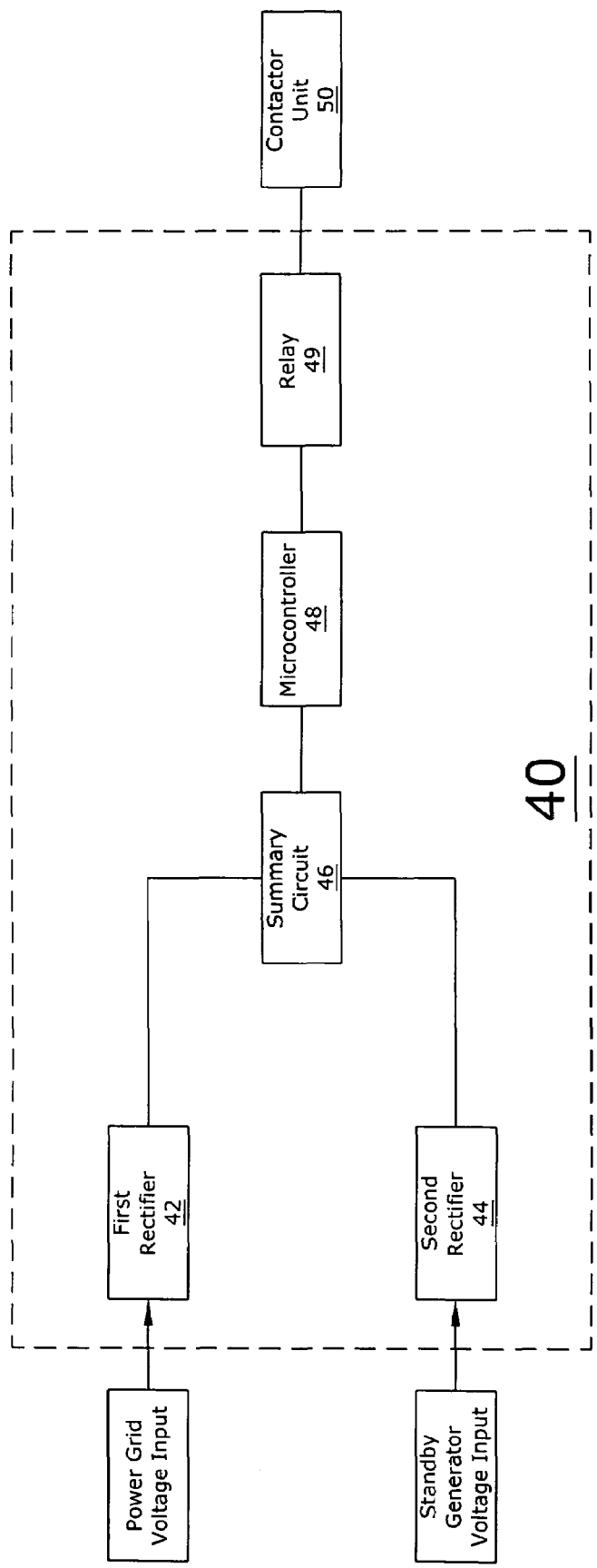
FIG. 3 is a block diagram of the present invention.
Figure 4:
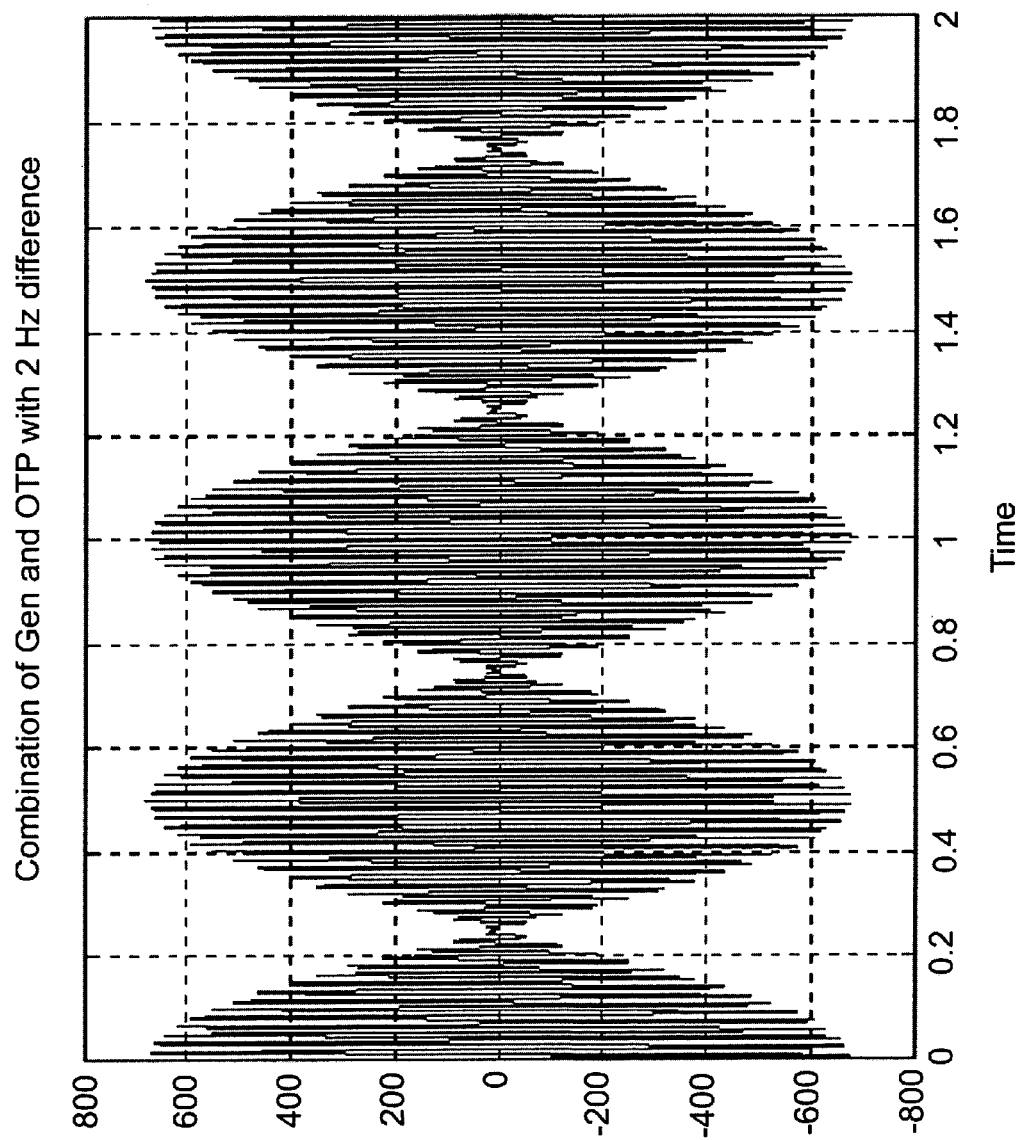
FIG. 4 is a chart of a illustrating the fundamental time period with a 2 Hz frequency differential between a standby generator voltage and a power grid voltage.

Each control unit 40 is in communication with a corresponding contactor unit 50 for controlling and monitoring the contactor unit 50 as shown in FIGS. 2 and 3 of the drawings. The control unit 40 also monitors the voltage (level, frequency, phase) of the power grid 12 and the standby generator 30 to determine the hard minimums to determine the preferred time to close the contactor unit 50. The control unit 40 may be directly controlled by a control center 20 and/or automatically controlled based upon conditions of the power grid 12 (e.g. brownout situation).

The control unit 40 includes a first rectifier 42 and a second rectifier 44 as shown in FIG. 3 of the drawings. The first rectifier 42 rectifies the power grid 12 voltage and the second rectifier 44 rectifies the standby generator 30 voltage. The rectified voltages are then added together via a summary circuit 46 in communication with the rectifiers 42, 44.

Figure 5:
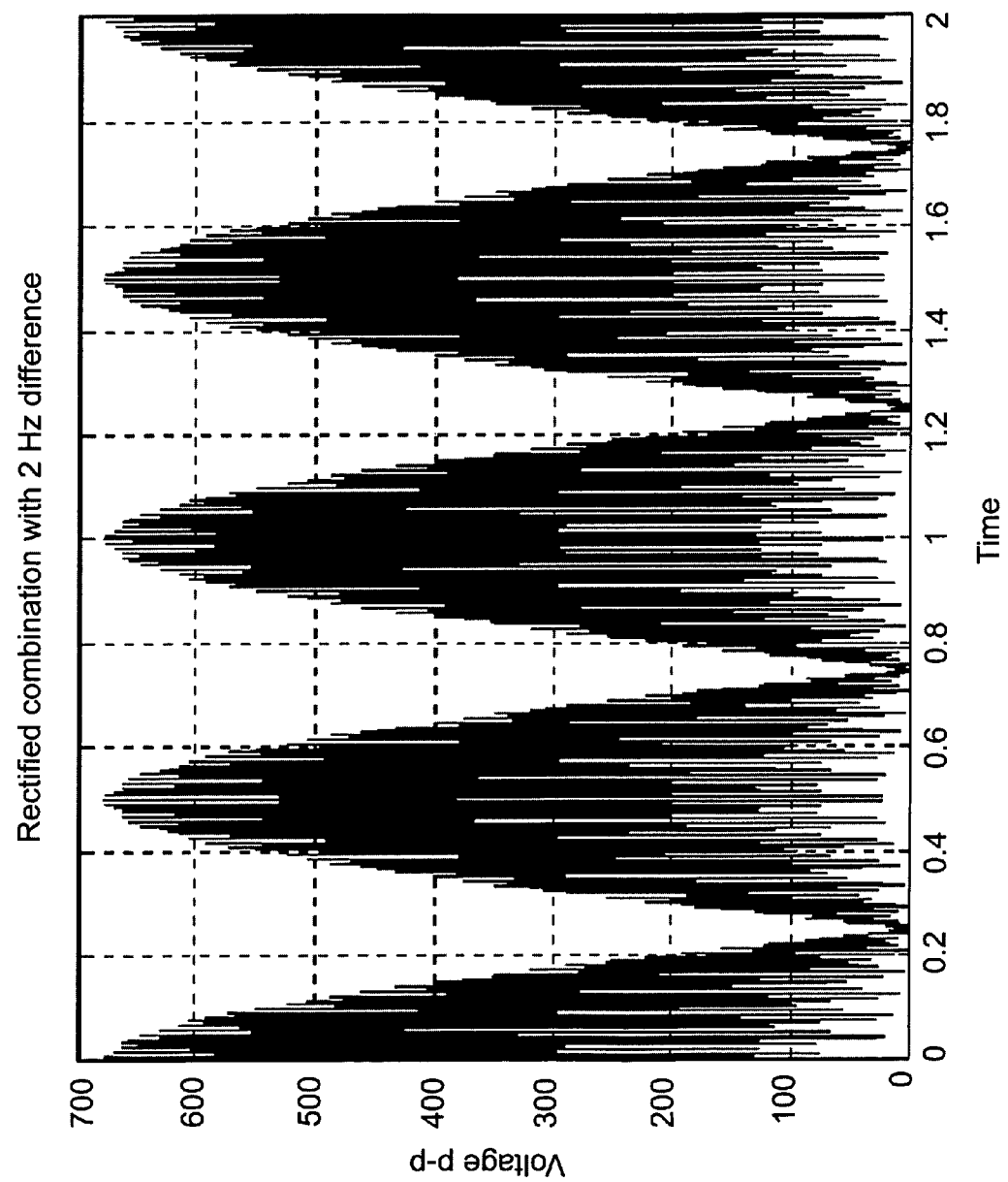
FIG. 5 is a chart illustrating the standby generator and power grid voltages rectified and summed together to determine the hard minimums.
Figure 6:
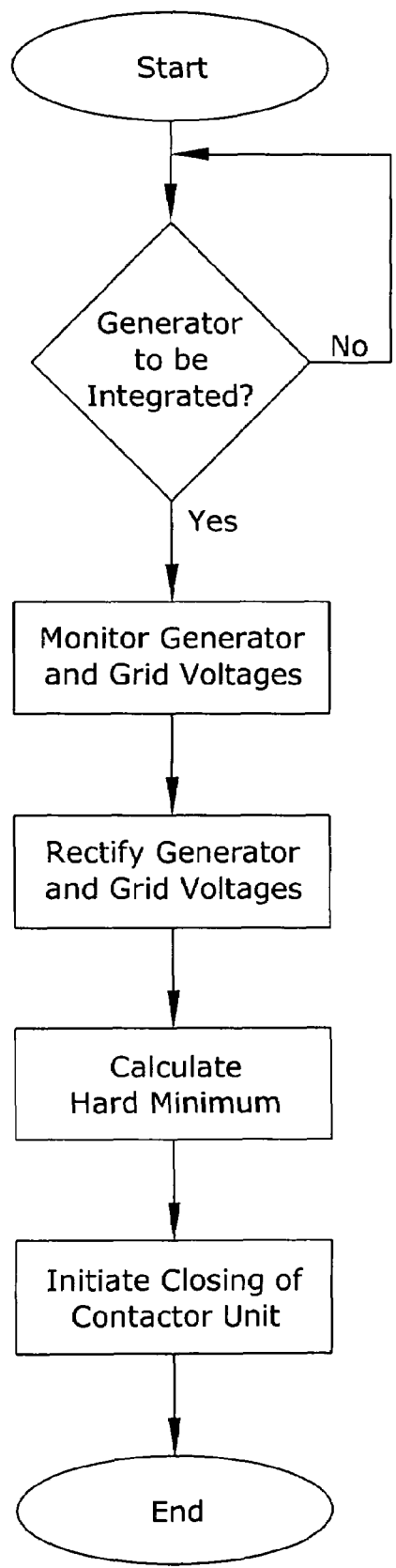
FIG. 6 is a flowchart illustrating the overall functionality of the present invention.

The summary circuit 46 is in communication with a microcontroller 48 where the microcontroller 48 calculates the hard minimums of the summed voltages. FIG. 5 illustrates the summed rectified voltages as communicated to the microcontroller 48. The microcontroller 48 is able to determine the first hard minimum and the next hard minimum. By calculating the time period between the two hard minimums, the microcontroller 48 is able to calculate future hard minimums ($3^{rd}$, $4^{th}$, $5^{th}$, etc.), as the hard minimums are periodic and deterministic.

The microcontroller 48 may continue to monitor and calculate the future hard minimums, adjusting accordingly to any changes in the time period. Utilizing the predetermined time delay of the contactor unit 50, the microcontroller 48 is able to calculate when closing of the contactor unit 50 should be initiated.

Figure 7:
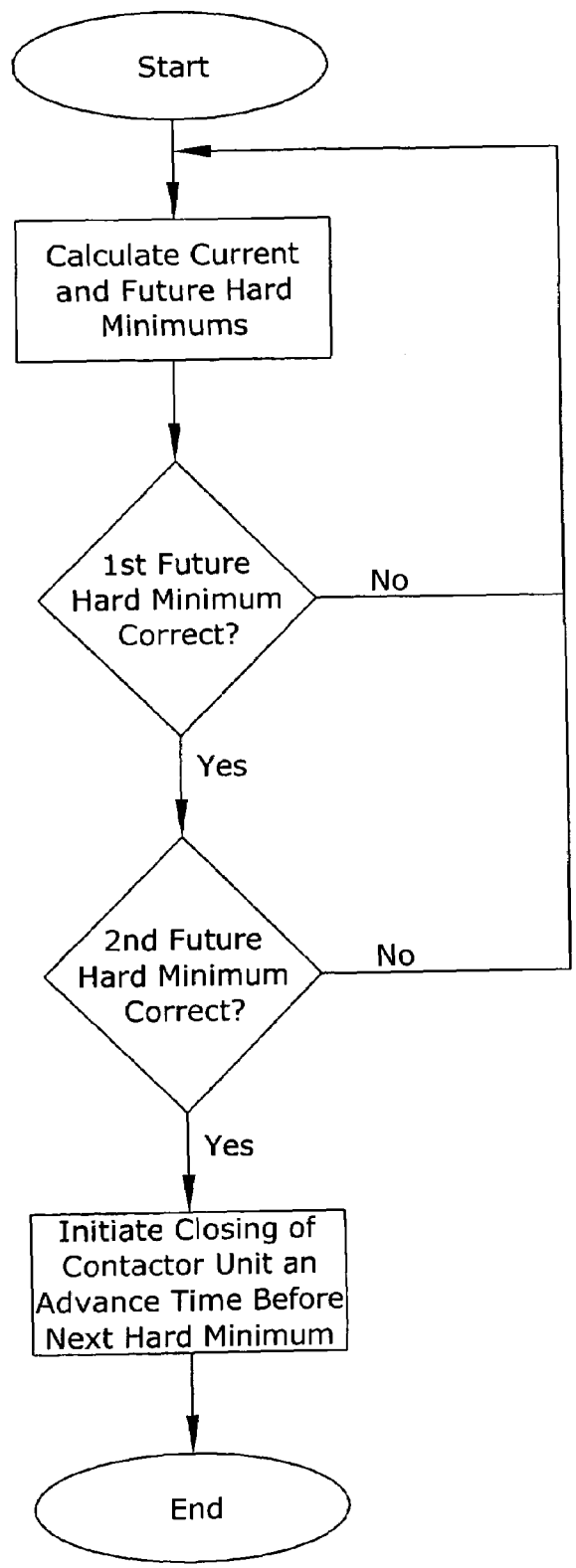
FIG. 7 is a flowchart illustrating the generator integration routine.

FIG. 7 illustrates the overall generator integration routine where the hard minimums are calculated and utilized to predict future hard minimums for comparison. Once the time period between the hard minimums is accurately calculated, the microcontroller 48 may close a relay, where the relay is connected to the contactor unit 50 (it can be appreciated that a separate relay is not required if the contactor unit 50 includes suitable circuitry).

F. Control Center

A control center 20 may be utilized to communicate with one or more of the control units 40. The control center 20 communicates with the control units 40 through a communications network 10 (FIG. 1) or by other well-known communication means (e.g. wireless, cable, power line). The control center 20 may automatically control the control units 40 based upon conditions of the power grid 12 (e.g. brownout situations, reduced capacity) or may be manually activated by a person depending upon various factors.

G. Operation of Invention

When a situation occurs that additional electrical power is required from a standby generator 30, the standby generator 30 is activated by either the control unit 40 or other means. The control unit 40 monitors the voltage of the standby generator 30 and the power grid 12 to determine the desired point to close the contactor unit 50 as shown in FIG. 7 of the drawings. After the time period between the hard minimums is established, the control unit 40 then calculates the "advance time" when to initiate the closing of the contactor unit 50 by first determining the desired closing time and then reducing the time by the predetermined time delay associated with the contactor unit 50.

The control unit 40 then initiates the closing of the contactor unit 50 at the calculated advance time. The contactor unit 50 closes the electrical connection of the standby generator 30 with the power grid 12 near or at the hard minimum as predicted. The control unit 40 may open if undesirable frequencies and voltages are generated by the connection of the standby generator 30 with the power grid 12.

As to a further discussion of the manner of usage and operation of the present invention, the same should be apparent from the above description. Accordingly, no further discussion relating to the manner of usage and operation will be provided.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A standby generator integration system, comprising:
   a contactor unit electrically coupled between a standby generator and a power grid; and
   a control unit in communication with said contactor unit, wherein said control unit monitors a generator voltage and a power grid voltage for calculating a hard minimum;
   wherein said control unit rectifies a generator voltage and a power grid voltage and then sums the rectified voltages together to calculate a hard minimum.

2. The standby generator integration system of claim 1, wherein said control unit includes a first rectifier that receives a power grid voltage and a second rectifier that receives a generator voltage.

3. The standby generator integration system of claim 2, wherein said control unit includes a summary circuit in communication with said first rectifier and said second rectifier for summing the rectified voltages to form a summed voltage.

4. The standby generator integration system of claim 3, wherein said control unit includes a microcontroller in communication with said summary circuit, wherein said microcontroller calculates one or more hard minimums of said summed voltage.

5. The standby generator integration system of claim 1, wherein said control unit initiates closing of said contactor unit an advance time prior to a desired closing time, wherein said advance time is similar to a delay time of said contactor unit.

6. A method of integrating a standby generator into a power grid, said method comprising the steps of:
   monitoring a power grid voltage and a generator voltage;
   rectifying said power grid voltage and said generator voltage;
   summing said rectified voltages;
   calculating a first hard minimum;
   calculating a second hard minimum;
   calculating a time period between said first hard minimum and said second hard minimum; and
   calculating one or more future hard minimums.

7. The method of integrating a standby generator of claim 6, including the step of initiating a closing of a contactor unit an advance time before a next hard minimum, wherein said advance time is approximately equal to a time delay of said contactor unit.

8. A standby generator integration system, comprising:
   a contactor unit electrically coupled between a standby generator and a power grid; and
   a control unit in communication with said contactor unit, wherein said control unit monitors a generator voltage and a power grid voltage for calculating a hard minimum;
   wherein said control unit rectifies a generator voltage and a power grid voltage and then sums the rectified voltages together to calculate a hard minimum;
   wherein said hard minimum is a lowest level of the summed rectified voltages;
   wherein said control unit initiates closing of said contactor unit an advance time prior to a desired closing time, wherein said advance time is similar to a time delay of said contactor unit.

9. The standby generator integration system of claim 8, wherein said control unit includes a first rectifier that receives a power grid voltage and a second rectifier that receives a generator voltage.

10. The standby generator integration system of claim 9, wherein said control unit includes a summary circuit in communication with said first rectifier and said second rectifier for summing the rectified voltages to form a summed voltage.

11. The standby generator integration system of claim 10, wherein said control unit includes a microcontroller in communication with said summary circuit, wherein said microcontroller calculates one or more hard minimums of said summed voltage.

* * * * *